(12) United States Patent
Kavia et al.

(10) Patent No.: US 12,143,427 B2
(45) Date of Patent: Nov. 12, 2024

(54) ACKNOWLEDGING THE PRESENCE OF TONES BEING SIGNALLED VIA SDP

(71) Applicant: MICROSOFT TECHNOLOGY LICENSING, LLC, Redmond, WA (US)

(72) Inventors: Anish Kavia, Slough (GB); Salem Amin Al-Damluji, Chorleywood (GB); Ranabahu Mudiyanselage Janaka Chandimal Ranabahu, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/958,260

(22) Filed: Sep. 30, 2022

(65) Prior Publication Data

US 2024/0114061 A1    Apr. 4, 2024

(51) Int. Cl.
*H04L 65/1069* (2022.01)
*H04L 65/1046* (2022.01)
*H04L 65/1104* (2022.01)

(52) U.S. Cl.
CPC ...... *H04L 65/1069* (2013.01); *H04L 65/1046* (2013.01); *H04L 65/1104* (2022.05)

(58) Field of Classification Search
CPC ............. H04L 65/1069; H04L 65/1104; H04L 65/1046; H04L 65/1073; H04L 65/1083; H04L 65/1101; H04L 65/80
USPC ......................................................... 709/228
See application file for complete search history.

(56) References Cited

U.S. PATENT DOCUMENTS

| | | | |
|---|---|---|---|
| 2004/0240399 A1 | 12/2004 | Corrao et al. | |
| 2006/0007916 A1* | 1/2006 | Jones | H04L 47/263 370/352 |
| 2014/0222963 A1* | 8/2014 | Gangadharan | H04L 65/1016 709/219 |

(Continued)

FOREIGN PATENT DOCUMENTS

WO    WO-2009056037 A1 *  5/2009    ......... H04L 65/1006

OTHER PUBLICATIONS

"Series V: Data Communication over the Telephone network", Retrieved from: https://www.itu.int/rec/T-REC-V.18-200011-I/en, Sep. 12, 2001, 64 Pages.

(Continued)

*Primary Examiner* — Glenford J Madamba
(74) *Attorney, Agent, or Firm* — Han Gim; Newport IP, LLC

(57) ABSTRACT

A Session Initiation Protocol (SIP) message containing a Session Description Protocol (SDP) offer for a communications session is sent to a first endpoint. The SDP offer includes a first parameter indicating whether the communications session will include media encoding TTY data, audio data, or both TTY data and audio data. An error response is received that indicates the device has rejected the first parameter. Based on the error response to the first endpoint, a modified SIP message containing the SDP offer for the communications session is sent to the first endpoint. The SDP offer of the modified message excludes the first parameter indicating whether the communications session will include media encoding TTY data, audio data, or both TTY data and audio data.

18 Claims, 9 Drawing Sheets

(56) References Cited

U.S. PATENT DOCUMENTS

2019/0014613 A1* 1/2019 Antsev .............. H04M 1/72463
2019/0068658 A1* 2/2019 Chiang .............. H04L 65/1089

OTHER PUBLICATIONS

Handley, et al., "SDP: Session Description Protocol", Retrieved from: https://www.rfc-editor.org/rfc/pdfrfc/rfc4566.txt.pdf, Jul. 2006, 49 Pages.

"International Search Report and Written Opinion Issued in PCT Application No. PCT/US23/027981", Mailed Date: Oct. 2, 2023, 12 Pages.

Wijk, et al., "Framework for real-time text over IP using the Session Initiation Protocol (SIP)", Retrieved From: "https://www.ietf.org/archive/id/draft-ietf-sipping-toip-07.txt", Aug. 16, 2006, pp. 1-27.

* cited by examiner

500

501 receiving, by a device in the communications network from a first endpoint, a Session Initiation Protocol (SIP) message containing a Session Description Protocol (SDP) offer for a communications session, the SDP offer including a first parameter indicating whether the communications session will include media encoding TTY data, audio data, or both TTY data and audio data

503 reading, by the device, the first parameter indicating whether the communications session will include media encoding TTY data, audio data, or both TTY data and audio data

505 sending, by the device, an SDP answer including a second parameter indicating whether the device is configured to process media encoding TTY data, audio data, or both TTY data and audio data

FIG. 5

ACKNOWLEDGING THE PRESENCE OF TONES BEING SIGNALLED VIA SDP

BACKGROUND

A text telephone device (TTY) is a communications device that allows users who are deaf or speech-impaired to use telephonic devices to communicate with other users. Communications device with a TTY mode can be used to send text-based messages over a telephone line or connection in a way that substitutes for voice calls. The TTY mode includes the use of tones that can be used to signal different letters that are sent as media over the telephone line or connection. The receiving TTY device can convert these tones into characters to be rendered on a display of the communications device. When a TTY call is being established, the endpoints may signal to each other what codecs are supported by each endpoint, and hence what media that each endpoint, or an intermediate node (Session Border Controller (SBC), for example) should expect. This information may be sent through the Session Description Protocol (SDP) description of a Session Initiation Protocol (SIP) message.

It is with respect to these considerations and others that the disclosure made herein is presented.

SUMMARY

The present disclosure provides a way for endpoints and intermediate devices in a communications network to inform the receiving endpoint about the media that the sending endpoint plans to send. In many systems today, when an endpoint is to send media, the endpoint will advertise which codec it will use. However, the endpoint does not indicate whether the media itself is audio content, tones, or some other format. As a result, calls may be connected based on the expected codecs, but the end users will not experience the expected outcome because the receiving endpoint may not have TTY capability when the sending endpoint is sending TTY media.

Network operators may thus waste resources on calls that could have been avoided. In an embodiment, the present disclosure provides a new format specific parameter in an SDP attribute line to signal the support of TTY tones. The disclosed embodiments enable devices in a communications network, for example intermediate devices such as a Session Border Controller (SBC), to determine whether to proceed with a call that may require unsupported formats or otherwise unexpected characteristics. By avoiding the establishment of unsupported calls, network operators may avoid the waste of resources such as bandwidth or allocation of media resources for the unsupported calls.

The techniques disclosed herein can allow communications networks to operate more efficiently by avoiding attempts to established sessions between incompatible devices, thus saving the use of memory, processing resources, network resources, etc. Other technical effects other than those mentioned herein can also be realized from implementations of the technologies disclosed herein.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 5 is a flowchart depicting an example procedure for managing a communications session in accordance with the present disclosure;

DETAILED DESCRIPTION OF ILLUSTRATIVE EMBODIMENTS

Figure 1:
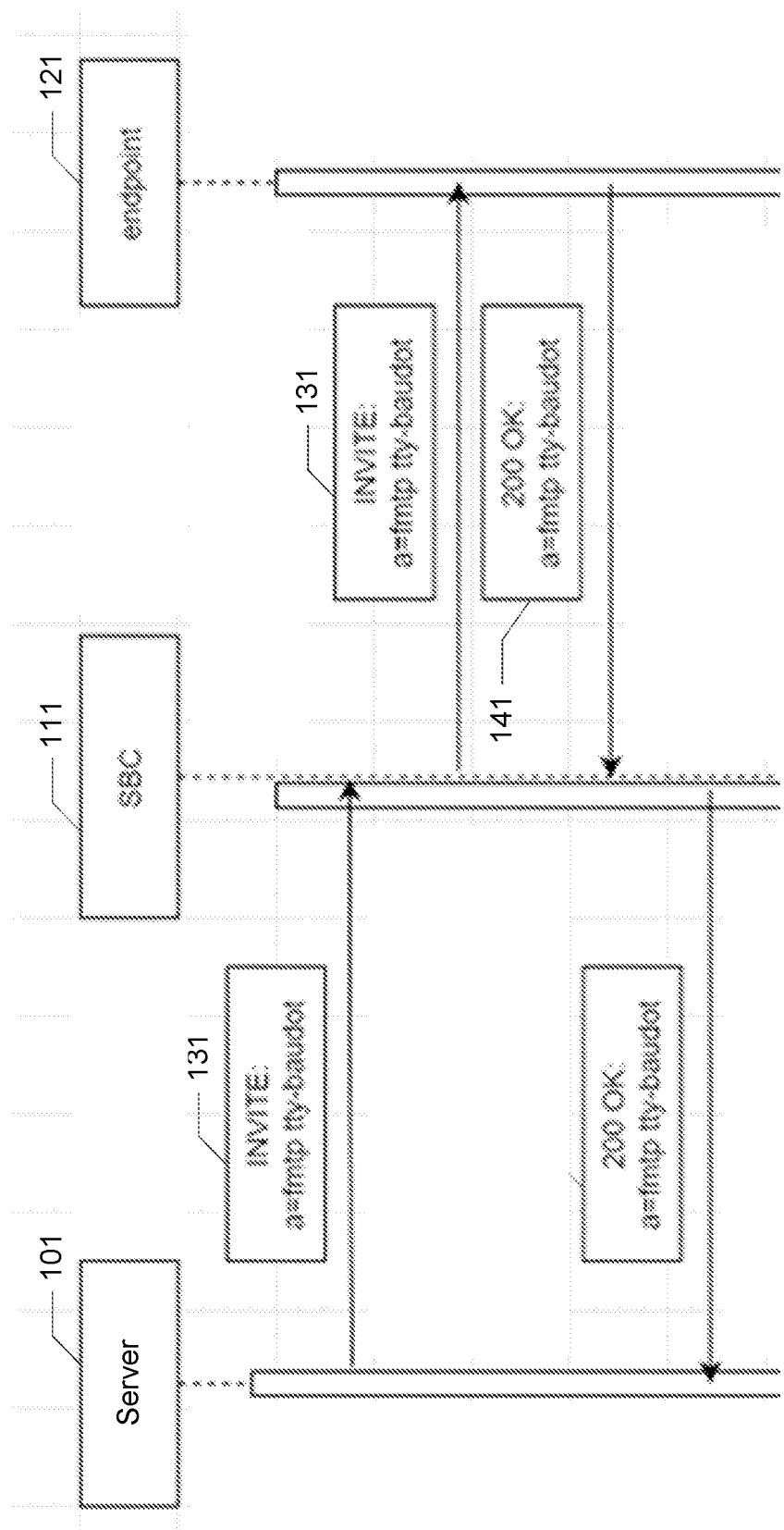
FIG. 1 is a diagram illustrating details of a communications network in accordance with the present disclosure.

When establishing a call in a communications network, the endpoints typically signal to each other what codecs they support and thus what media the endpoints or an intermediate node (SBC for example) should expect. This information may be sent through the SDP of a SIP message. In one example, a SIP Invite message using SDP may include information such as:

INVITE sip: name@company.com SIP/2.0
Via: SIP/2.0/UDP 10.220.20.28:5060; branch=z
From:
To:
Contact:
Call-ID:
CSeq:
Authorization:
Max-Forwards:
Content-Type:
User-Agent:
Content-Length: 246
v=0
o=
s=
c=
t=
m=audio 51866 RTP/AVP 0 18 101
a=rtpmap:0 pcmu/8000
a=rtpmap:18 G729/8000
a=rtpnimp:101 telephone-event/8000
a=fmtp:101 0-15
a=sendrecv Which codecs an endpoint will use can be signaled through the "m=*" line and described via the attribute lines "a=*".

Currently there is no method to signal, via the SDP or SIP headers, whether an endpoint will be sending TTY tones. A media stream may be using a specific codec, and in the above example, the codec is PCMU. However, this information does not indicate what the media stream content actually contains. The media stream could be of a person speaking but not contain any TTY tones. Alternatively, the media stream could include speech as well as TTY tones, in which case the receiving endpoint would need to be capable of TTY processing.

More generally, the inability to provide an indication or signal whether an endpoint will be sending TTY tones can result in various problems, such as:

- A standard voice phone may receive a TTY call. In this case, the called user would hear unintelligible tones.
- A TTY device may receive a standard voice call. In this case, the called user does not receive any text on their screen.
- In both of the above circumstances, it would be preferable if the receiving user's phone did not ring, and thus avoid causing the user to pick up an unusable call and avoid wasting network operator resources.
- A network operator may not incorporate interworking from TTY to a more modern protocol (e.g., Real-time Text (RTT)) when such a protocol would be useful to the end user.
- A network operator may incorrectly engage in interworking from TTY to a more modern protocol (e.g., RTT) when TTY is not in use.
- A network operator may expend resources attempting to detect whether TTY tones are in use on the stream, in order to determine whether TTY interworking is desirable on the call.

As shown above, the inability to provide the indication or signal whether an endpoint will be sending TTY tones can result inefficient use of resources as well as a poor user experience. The present disclosure describes a new format specific parameter in the attribute line of an SDP formatted header to indicate that an offered communication session supports TTY tones. In various embodiments, the disclosed attribute line informs the receiving endpoint whether TTY tones are in use in the media flow, allowing the endpoint to take appropriate action (e.g., enable detection or interworking features, reject the call, proceed as normal, etc.) in light of the informed TTY state.

The disclosed embodiments are beneficial for network operators as there is no need for tone detection, and the network operators may save resources by rejecting unsupported calls as early as possible, saving on bandwidth by avoiding attempts to accept calls that are incompatible in the network.

In one embodiment, the format specifier may be implemented in the payload it applies to and a receiver may check the fmtp information that applies to the given codec. In one example provided below, the payload is 0 PCMU. One advantage of using a fmtp specifier is that the specifier is backward-compatible, so older devices that receive an SDP formatted header with the disclosed format specifier can continue as normal.

In one example, the attribute line can be:
v=0
o=2223330003 69099683 69099763 IN IP4 68.117.255.163
s=X-PRO Lucent
c=IN IP4 10.220.20.28
t=0 0
m=audio 51866 RTP/AVP 0 18 101
a=rtpmap:0 PCMU/8000
a=rtpmap:18 G729/8000
a=rtpmap:101 telephone-event/8000
a=fmtp:101 0-15
a=fmtp:0 tty-baudot
a=sendrecv As shown, the disclosed fmtp parameter can be used to signal what type of media will be received. In some embodiments, various combinations may be implemented, for example:
Default—this may be used for audio/video and to preserve normal behavior if a tone type is not defined
tty-baudot
tty-edt
tty-bell103

FIG. 1 is an example call flow illustrating the disclosed attribute parameter being successfully passed through a call. Referring to FIG. 1, a server 101 of a communications system such as Teams may send an Invite message 131 with format specifier a=fmtp:0 tty-baudot. The Invite message 131 may be received by session border controller (SBC) 111, which may be configured to provide interworking between incompatible signaling messages and media flows (sessions) from end devices or application servers. The SBC 111 may send the Invite message 131 to the endpoint 121. The endpoint 121 may receive the Invite message 131 and identify, based on the format specifier a=fmtp:0 tty-baudot, whether the endpoint 121 is capable of supporting TTY. If the endpoint 121 is capable of supporting TTY, the endpoint 121 may send a success status response 200 OK 141, which may include the format specifier a=fmtp:0 tty-baudot. The SBC 111 may send the response 200 OK 141 to the server 101.

In some embodiments, the SBC itself can make decisions on how to handle a given call based on the a=fmtp parameter it receives. For example, the SBC may reject a call because the SBC has determined, based on the presence or absence of the disclosed format specifiers, that one endpoint will be sending TTY tones, while the other endpoint is expecting and sending audio without tones. As such a call will not be understood by either endpoint, rejection of the call can save network resources and avoid a poor user experience.

Figure 2:
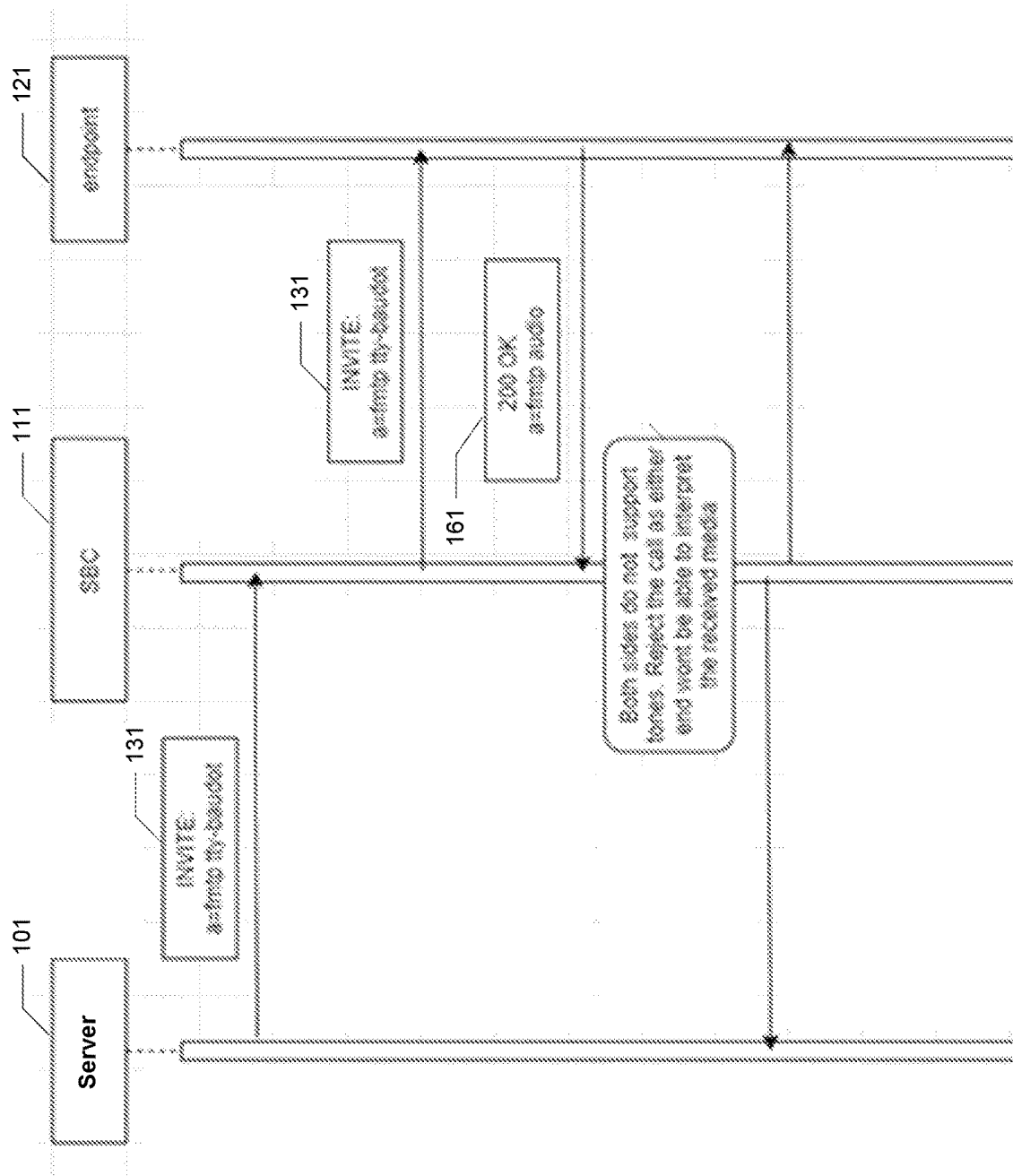
FIG. 2 is a diagram illustrating details of a communications network in accordance with the present disclosure.

Referring to FIG. 2, illustrated is an example of tearing down or rejecting a call when both endpoints do not support the same media/content types. Referring to FIG. 2, server 101 of the communications system may send Invite message 131 with format specifier a=fmtp tty-baudot. The Invite message 131 may be received by session border controller (SBC) 111, which may be configured to provide interworking between different signaling messages and media flows (sessions) from end devices or application servers. The SBC 111 may send the Invite message 131 to the endpoint 121. The endpoint 121 may receive the Invite message 131. The endpoint 121 may send a success status response 200 OK 161, which in this example includes the format specifier a=fmtp audio. This format specifier conflicts with the format specifier a=fmtp tty-baudot of the Invite message, and indicates that the endpoint 121 will not be capable of supporting TTY. The SBC 111 may determine that the endpoint 101 and endpoint 121 are not compatible, and reject the attempted call.

The examples shown in FIG. 1 and FIG. 2 are provided for illustrative purposes. Other architectures and components may incorporate the described techniques. For example, a MicroSIP audio phone may only be configured for audio calls and may thus always set the format specifier as audio. In another example, TTY Emulator has TTY capability and may always set the format specifier as TTY capable. Some interworking devices may be configured with multiple modes and may be able to support both TTY and audio. In one embodiment, the interworking device may not have a priori knowledge of the modes and may be configured to examine inbound content, identify the content, and set the format specifier as appropriate for outgoing messages based on the identified content. In this way, the interworking device can perform the processing necessary to facilitate TTY compatibility according to the disclosed techniques. Additionally, the interworking device can perform the processing and mitigate the requirement that every device or endpoint have the capability to identify and respond to the format specifier.

In one embodiment, a given network can be configured so that all devices and endpoints in the network will support TTY or audio. In other embodiments, some devices and endpoints can be statically configured to be TTY-only or audio-only.

In some embodiments, devices and endpoints may be configured to recognize the format specifier even if the device or endpoint is not able to handle TTY tones. For example, the device or endpoint may be capable of recognizing the format specifier and refuse connections for sessions that the device or endpoint cannot support.

In embodiments, features and processes may be implemented to manage and interact with the new tones a=fmtp parameter.

As this is a new parameter, some devices may reject the parameter because the devices do not recognize the parameter in the SDP. In some embodiments, a device or function may attempt to resend an INVITE without the tone parameter if a 400 or 415 error is received. By resending an INVITE without the tone parameter if a 400 or 415 error is received, the network or system accounts for the fact that the new parameter provides additional information about a call, but at the same time is not a required parameter. Therefore, the system or network can make more efficient use of resources by avoiding rejecting a good call due to non-recognition of the new parameter.

Figure 3:
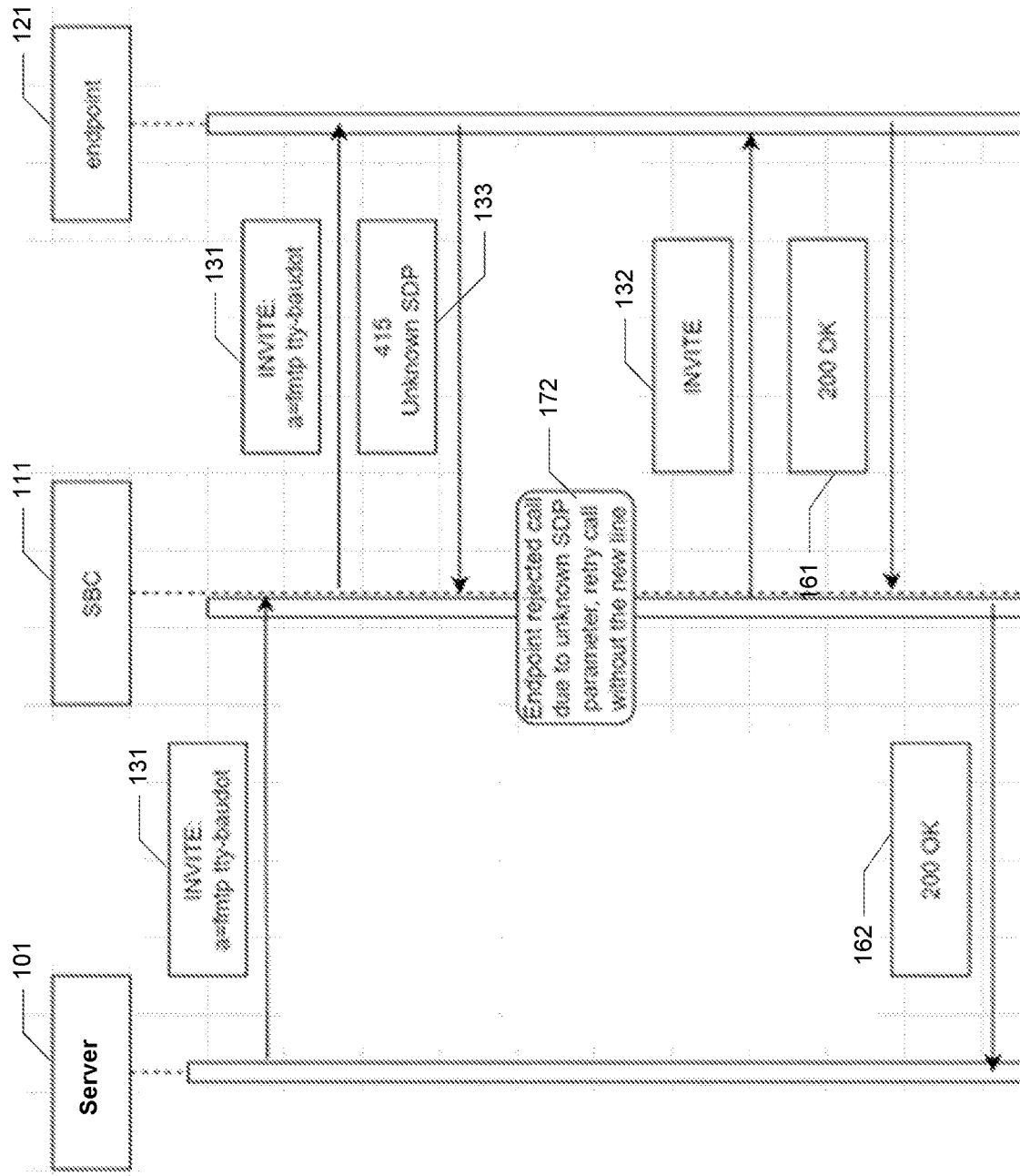
FIG. 3 is a diagram illustrating details of a communications network in accordance with the present disclosure.

Referring to FIG. 3, illustrated is an example of an endpoint rejecting the new parameter in a call flow. Referring to FIG. 3, server 101 of the communications system may send Invite message 131 with format specifier a=fmtp tty-baudot. The Invite message 131 may be received by session border controller (SBC) 111, which may be configured to provide interworking between different signaling messages and media flows (sessions) from end devices or application servers. The SBC 111 may send the Invite message 131 to the endpoint 121. The endpoint 121 may receive the Invite message 131. The endpoint 121 may send error 415 due to an unknown SDP 133 as illustrated in 172. The SBC 111 may remove the format specifier a=fmtp tty-baudot and send Invite 132. The endpoint 121 may receive the Invite message 132. The endpoint 121 may send a success status response 200 OK 161. The endpoint 121 may receive the Invite message 132. The SBC 111 may send a success status response 200 OK 162.

Another example is where the SBC reacts based on the new parameter being passed. In this example, the SBC detects TTY tones in the data from the calling device. Based on detection of the TTY tones, the SBC can respond and generate an outbound offer that that can make the system more efficient or improve operation of the communications network. Due to TTY support on the inbound flow, the SBC can decide to offer RTT to the callee. The SBC can also choose not to offer G729, as G729 cannot carry tones.

Figure 4:
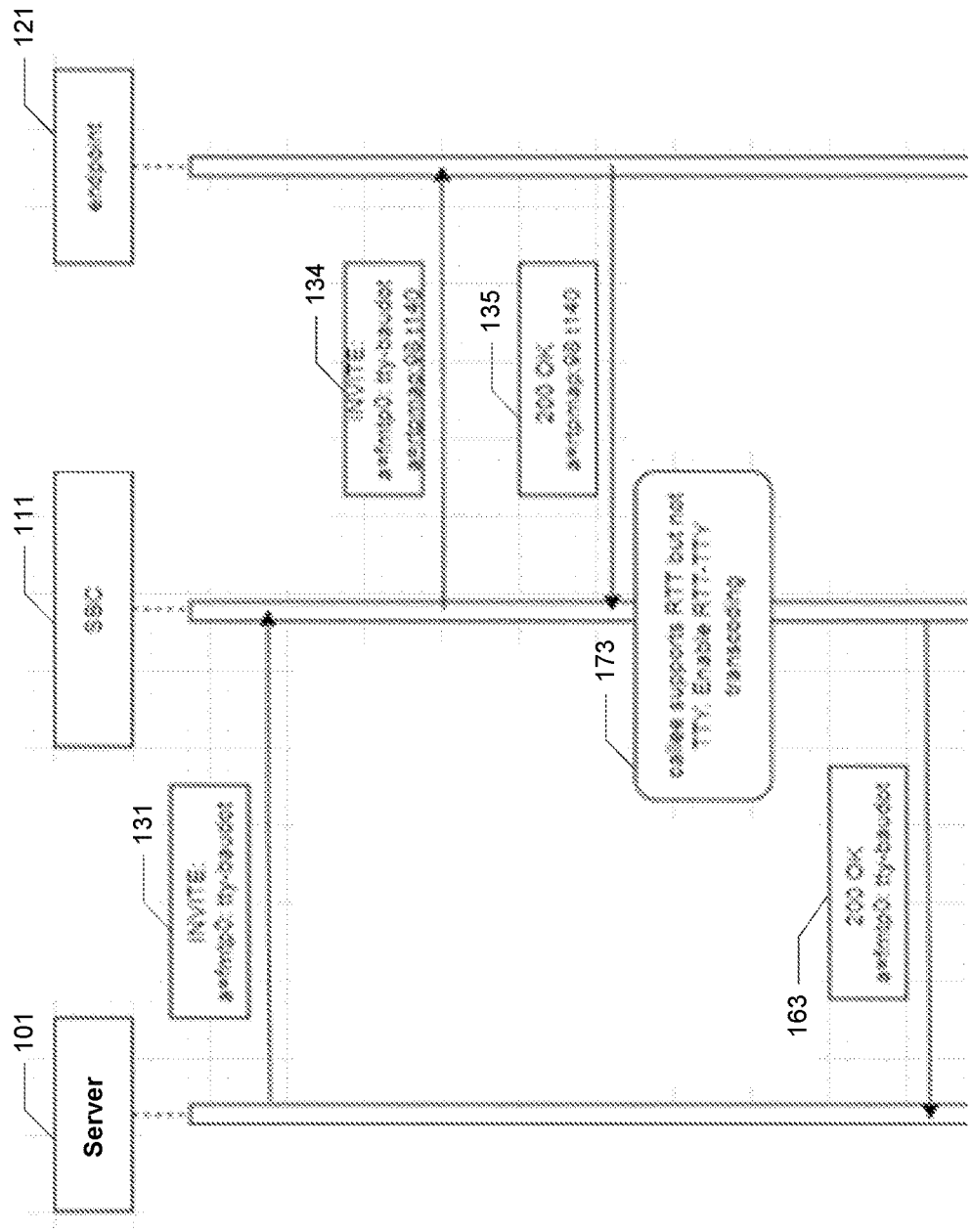
FIG. 4 is a diagram illustrating details of a communications network in accordance with the present disclosure.

Referring to FIG. 4, illustrated is an example of offering codecs based on the new attribute. Referring to FIG. 4, server 101 of the communications system may send Invite message 131 with format specifier a=fmtp tty-baudot. The Invite message 131 may be received by session border controller (SBC) 111, which may be configured to provide interworking between different signaling messages and media flows (sessions) from end devices or application servers. The SBC 111 may modify the Invite message 131 to indicate the RTP payload type, and send the modified Invite message 131 to the endpoint 121. The endpoint 121 may receive the Invite message 131. The endpoint 121 may send a success status response 200 OK 161, which in this example includes the format specifier a=rtpmap: 98 t140. The call supports RTT but not TTY, and the SBC 111 facilities enabling RTT-TTY transcoding. The SBC 111 sends 200 OK 163 with format specifier a=fmtp tty-baudot.

In some embodiments, if TTY tones are not received on the initial offer from the caller, the SBC does not offer RTT to the callee and instead offers G729. This applies not only apply to SBCs but any intelligent intermediate device configured to act based on this parameter. For example, a communications agent may not use SIP but a communications server may use SIP and can reject a call on behalf of the endpoint, based on the server's knowledge of what it supports and what it received in the SIP offer.

In some embodiments, aspects of the present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Turning now to FIG. 5, illustrated is an example operational procedure for managing communications sessions in a communications network in accordance with the present disclosure. In an embodiment, the computing environment comprises a plurality of computing devices. In an embodiment, the network traffic may be associated with a target application, end point, or other network element. Such an operational procedure may provide for capturing network traffic and can be provided by one or more components or functions illustrated in FIGS. 1-4. The operational procedure may be implemented in a system comprising one or more computing devices. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 500 is described as running on a system, it can be appreciated that the routine 500 and other operations described herein can be executed on an individual computing device or several devices.

Referring to FIG. 5, operation 501 illustrates receiving, by a device in the communications network from a first endpoint, a Session Initiation Protocol (SIP) message containing a Session Description Protocol (SDP) offer for a communications session. In an embodiment, the SDP offer includes a first parameter indicating whether the communications session will include media encoding TTY data, audio data, or both TTY data and audio data.

Operation 501 may be followed by operation 503. Operation 503 illustrates reading, by the device, the first parameter indicating whether the communications session will include media encoding TTY data, audio data, or both TTY data and audio data.

Operation 503 may be followed by operation 505. Operation 505 illustrates sending, by the device, an SDP answer including a second parameter indicating whether the device is configured to process media encoding TTY data, audio data, or both TTY data and audio data.

Figure 6:
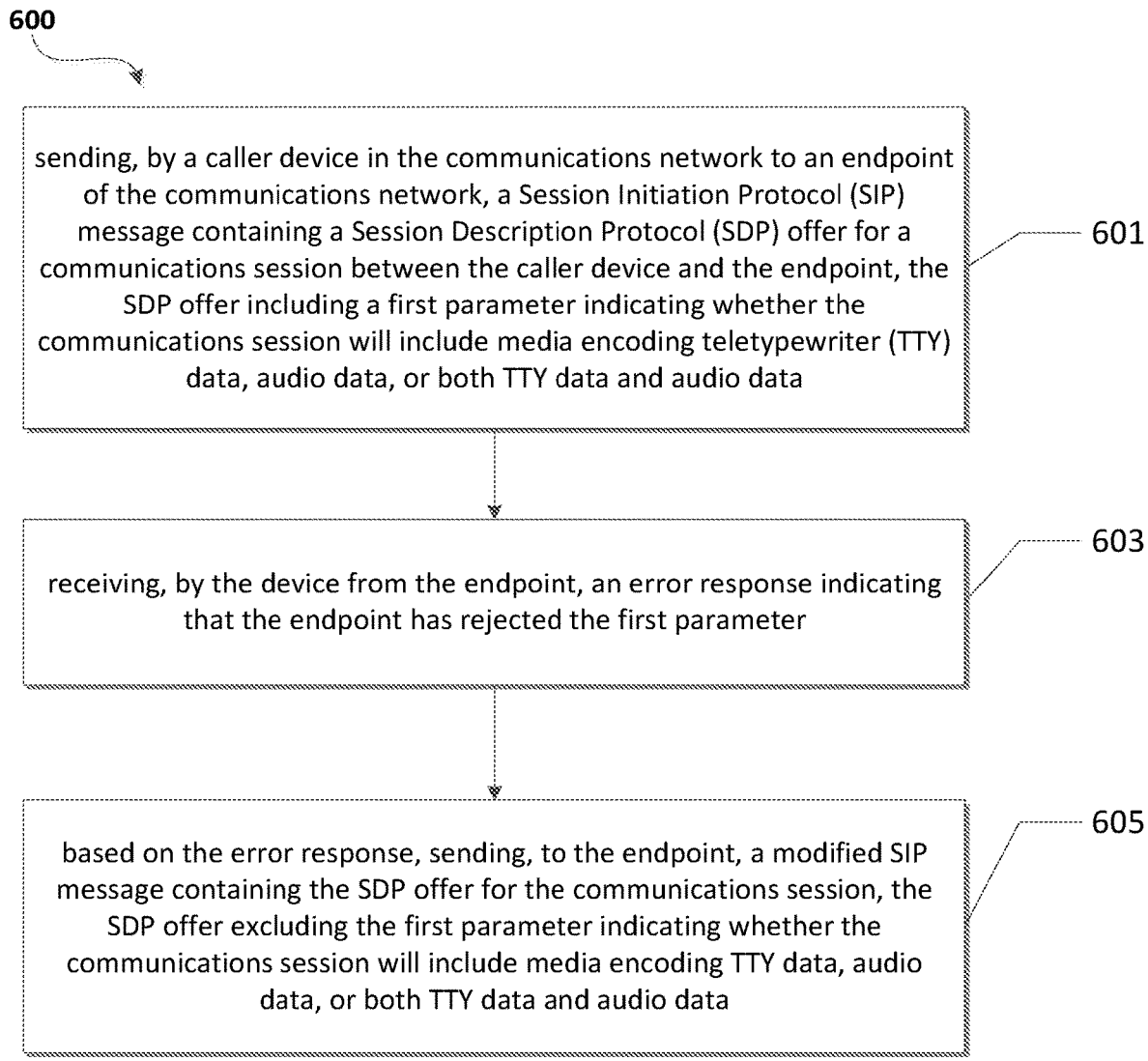
FIG. 6 is a flowchart depicting an example procedure for managing a communications session in accordance with the present disclosure.

Referring to FIG. 6, illustrated is another example operational procedure for managing communications sessions in a communications network. Such an operational procedure can be provided by services shown in FIGS. 1-4. The operational procedure may be implemented in a system comprising one or more computing devices. Referring to FIG. 6, operation 601 illustrates sending, by a caller device in the communications network to an endpoint of the communications network, a Session Initiation Protocol (SIP) message containing a Session Description Protocol (SDP) offer for a communications session between the caller device and the endpoint. In an embodiment, the SDP offer includes a first parameter indicating whether the communications session will include media encoding teletypewriter (TTY) data, audio data, or both TTY data and audio data.

Operation 601 may be followed by operation 603. Operation 603 illustrates receiving, by the device from the endpoint, an error response indicating that the endpoint has rejected the first parameter.

Operation 603 may be followed by operation 605. Operation 605 illustrates based on the error response, sending, to the endpoint, a modified SIP message containing the SDP offer for the communications session, the SDP offer excluding the first parameter indicating whether the communications session will include media encoding TTY data, audio data, or both TTY data and audio data.

Figure 7:
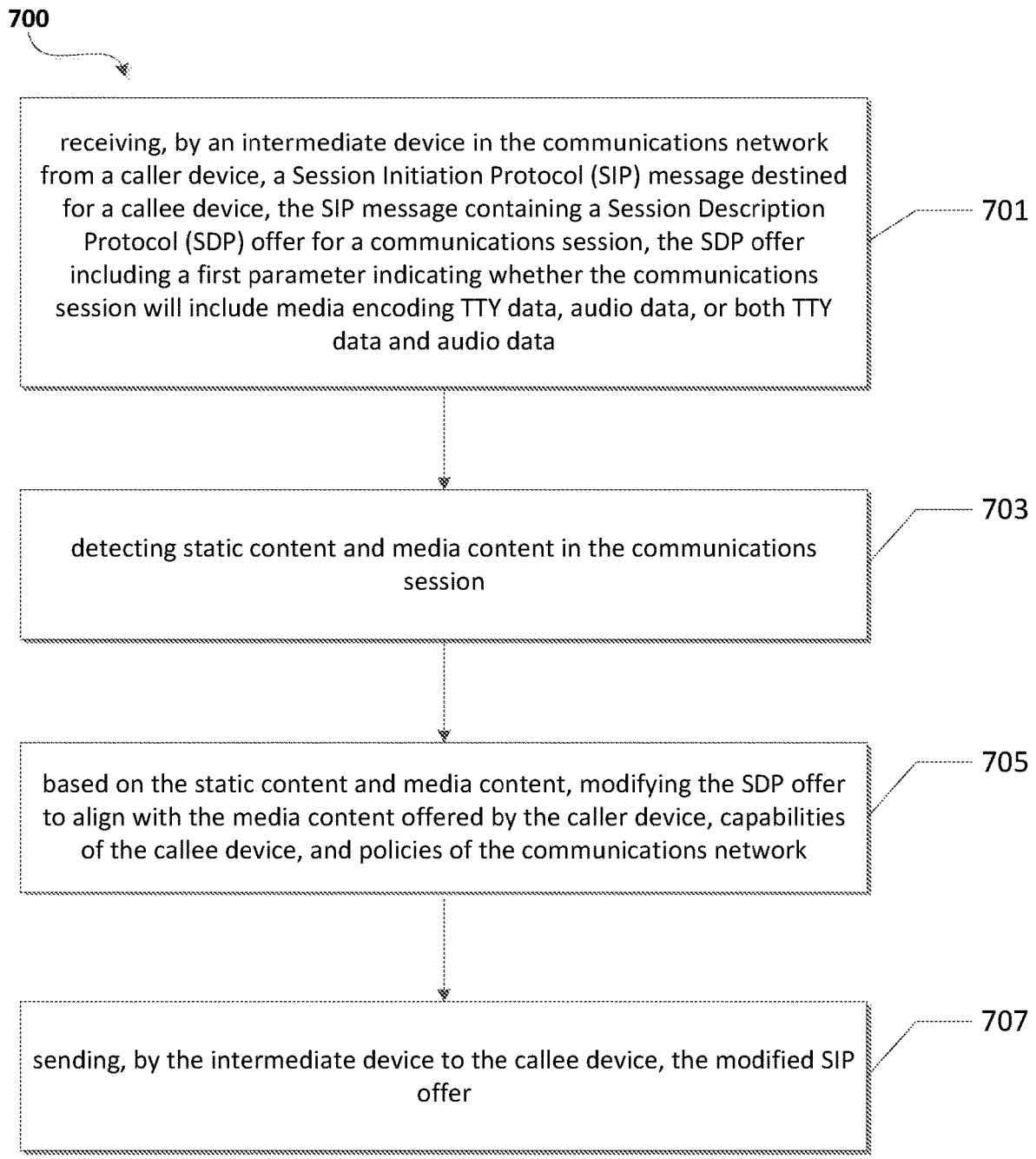
FIG. 7 is a flowchart depicting an example procedure for managing a communications session in accordance with the present disclosure.

Referring to FIG. 7, illustrated is another example operational procedure for managing communications sessions in a communications network. Such an operational procedure can be provided by services shown in FIGS. 1-4. The operational procedure may be implemented in a system comprising one or more computing devices. Referring to FIG. 7, operation 701 illustrates receiving, by an intermediate device in the communications network from a caller device, a Session Initiation Protocol (SIP) message destined for a callee device. In an embodiment, the SIP message contains a Session Description Protocol (SDP) offer for a communications session. In an embodiment, the SDP offer includes a first parameter indicating whether the communications session will include media encoding TTY data, audio data, or both TTY data and audio data.

Operation 701 may be followed by operation 703. Operation 703 illustrates detecting static content and media content in the communications session.

Operation 703 may be followed by operation 705. Operation 705 illustrates based on the static content and media content, modifying the SDP offer to align with the media content offered by the caller device, capabilities of the callee device, and policies of the communications network.

Operation 705 may be followed by operation 707. Operation 707 illustrates sending, by the intermediate device to the callee device, the modified SIP offer.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 8:
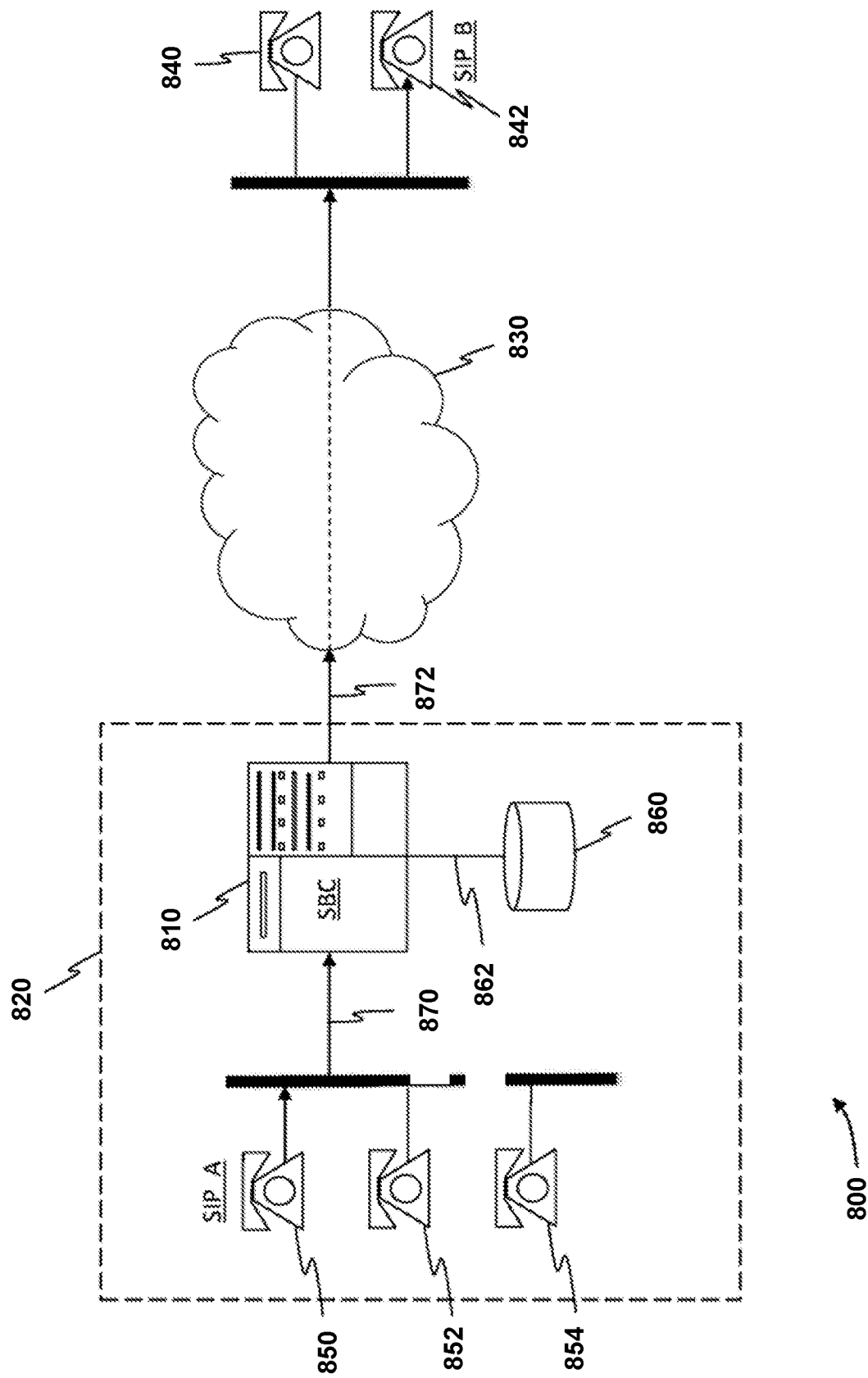
FIG. 8 is an example architecture in accordance with the present disclosure.

Referring to FIG. 8, illustrated is an example of a Session Border Controller, (SBC) 810 in a telecommunications network system 800. In an example, the telecommunications network system 800 comprises a local network 820 such as a Voice Over Internet Protocol (VoIP) network, and a wide area network 830 such as the internet. The VoIP clients 850, 852, and 854 are provided in the local network 820 which can communicate with each other in the local domain, and can communicate with remote VoIP clients 840, 8482 via the internet 830.

The local and wide area networks are packet-based telecommunications networks. The SBC 810 is deployed at the logical edge of the local network 820 on the boundary between the local network 820 and the wide area network 830. The SBC 810 acts as an application gateway device. The SBC 810 protects the local network 820 by policing communication sessions such as voice calls (or 'VoIP calls') flowing into or out of the local network 820.

Communication sessions such as voice calls between the VoIP clients 850, 852, 854 and the VoIP clients 840, 8482 will pass through the SBC 810. These voice calls are set up using call signaling messages. The call signaling messages follow a call signaling path typically spanning a plurality of network nodes including one or more intermediate network devices and the SBC 810. In this example, the user data of the call session (voice, video or other media exchanged after call setup) follows the same path as the call signaling path through the SBC 810.

The call signaling messages in this example are formatted according to a standardized call signaling protocol, for example, the Session Initiation Protocol (SIP) defined by the Internet Engineering Task Force (IETF) in standards document RFC3261. The SBC 810 can process inbound call signaling messages such as those received via the signal leg 870 to, for example, strip out sensitive information to protect user identities or network topologies, or to normalize the addressing information in messages so that they are understood by other network nodes downstream of the SBC 810.

As well as processing the call signaling messages that flow in and out of the VoIP network along the signaling path 870, 872, the SBC 810 can also create secondary control messages to servers away from the signaling path, for example to billing servers, authentication servers or policy control servers. FIG. 4 illustrates a server positioned away from the call signaling path which in this example is a policy control server 860. The SBC 810 communicates with the policy control server 860 over a communication link 862 using a different communication protocol from the call signaling protocol SIP used on the call signaling path. The communication protocol used in this example is the standardized Diameter protocol defined by the IETF in standards document RFC6733.

A SIP INVITE request message can be sent by the SIP user agent/VoIP client 480. The SIP INVITE message is used for initiating a call session with another user agent. The SIP message includes a SIP Header and SIP Body. A number of SIP header fields are included in the message including addressing fields "To" and "From" as well as identifiers such as "Call-ID", and a field "Content-Type" indicating that the body of the SIP message is in the SDP format.

Figure 9:
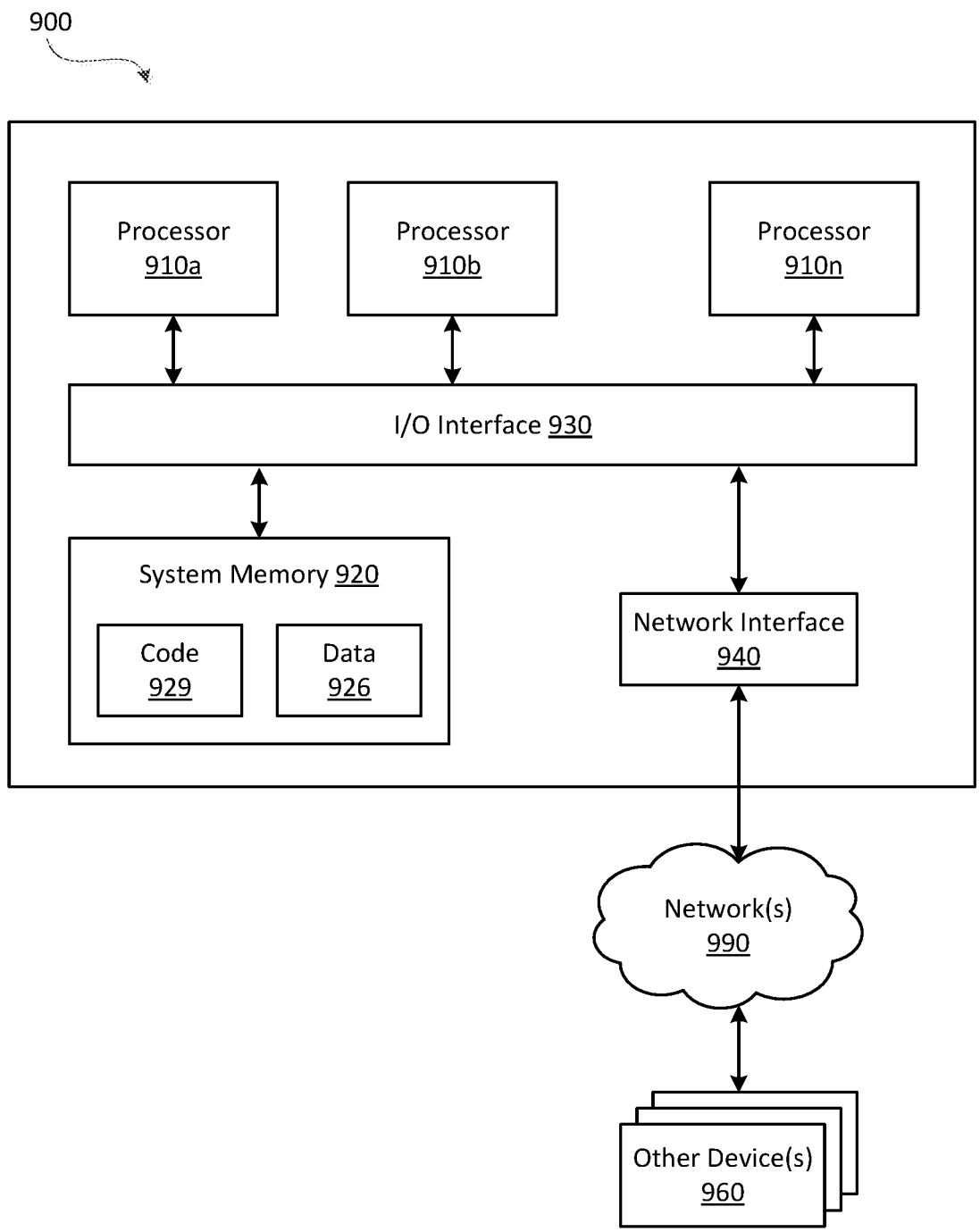
FIG. 9 is an example computing device in accordance with the present disclosure.

In some embodiments, a server or other computing device that implements a portion or all of one or more of the technologies described herein, including the techniques to implement the capturing of network traffic includes a general-purpose computer system that includes or is configured to access one or more computer-accessible media. FIG. 9 illustrates such a general-purpose computing device 900. In the illustrated embodiment, computing device 900 includes one or more processors 910a, 910b, and/or 910n (referred herein singularly as "a processor 910" or in the plural as "the processors 910") coupled to a system memory 920 via an input/output (I/O) interface 930. Computing device 900 further includes a network interface 940 coupled to I/O interface 930.

In various embodiments, computing device 900 can be a uniprocessor system including one processor 910 or a multiprocessor system including several processors 910 (e.g., two, four, eight, or another suitable number). Processors 910 can be any suitable processors capable of executing instructions. For example, in various embodiments, processors 910 can be general-purpose or embedded processors implementing any of a variety of instruction set architectures (ISAs), such as the x96, PowerPC, SPARC, or MIPS ISAs, or any other suitable ISA. In multiprocessor systems, each of processors 910 commonly, but not necessarily, implement the same ISA.

System memory 920 is configured to store instructions and data accessible by processor(s) 910. In various embodiments, system memory 920 is implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 925 and data 926.

In one embodiment, I/O interface 930 is configured to coordinate I/O traffic between the processor 910, system memory 920, and any peripheral devices in the device, including network interface 940 or other peripheral interfaces. In some embodiments, I/O interface 930 performs any necessary protocol, timing, or other data transformations to convert data signals from one component (e.g., system memory 920) into a format suitable for use by another component (e.g., processor 910). In some embodiments, I/O interface 930 includes support for devices attached through various types of peripheral buses, such as a variant of the Peripheral Component Interconnect (PCI) bus standard or the Universal Serial Bus (USB) standard, for example. In some embodiments, the function of I/O interface 930 is split into two or more separate components. Also, in some embodiments some or all of the functionality of I/O interface 930, such as an interface to system memory 920, can be incorporated directly into processor 910.

Network interface 940 is be configured to allow data to be exchanged between computing device 900 and other device or devices 960 attached to a network or network(s) 950, such as other computer systems or devices as illustrated in FIGS. 1 through 4, for example. In various embodiments, network interface 940 supports communication via any suitable wired or wireless general data networks, such as types of Ethernet networks, for example. Additionally, network interface 940 supports communication via telecommunications/telephony networks such as analog voice networks or digital fiber communications networks, via storage area networks such as Fibre Channel SANs or via any other suitable type of network and/or protocol.

In some embodiments, system memory 920 is one embodiment of a computer-accessible medium configured to store program instructions and data as described above for FIGS. 1-7 for implementing embodiments of the corresponding methods and apparatus. However, in other embodiments, program instructions and/or data are received, sent or stored upon different types of computer-accessible media. A computer-accessible medium includes non-transitory storage media or memory media, such as magnetic or optical media, e.g., disk or DVD/CD coupled to computing device 900 via I/O interface 930. A non-transitory computer-accessible storage medium also includes any volatile or non-volatile media, such as RAM (e.g., SDRAM, DDR SDRAM, RDRAM, SRAM) and ROM, that are included in some embodiments of computing device 900 as system memory 920 or another type of memory. Further, a computer-accessible medium include transmission media or signals such as electrical, electromagnetic or digital signals, conveyed via a communication medium such as a network and/or a wireless link, such those implemented via network interface 940. Portions or all of multiple computing devices, such as those illustrated in FIG. 9, are used to implement the described functionality in various embodiments; for example, software components running on a variety of different devices and servers collaborate to provide the functionality. In some embodiments, portions of the described functionality are implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media include volatile and non-volatile, removable and non-removable media implemented in any method or technology for storage of information such as computer-readable instructions, data structures, program modules or other data. For example, computer media includes RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also transform the physical structure of the computer-readable media presented herein. The specific transformation of physical structure depend on various factors, in different implementations of this description. Examples of such factors include the technology used to implement the computer-readable media, whether the computer-readable media is characterized as primary or secondary storage, and the like. For example, if the computer-readable media is implemented as semiconductor-based memory, the software disclosed herein are encoded on the computer-readable media by transforming the physical state of the semiconductor memory. For example, the software transforms the state of transistors, capacitors, or other discrete circuit elements constituting the semiconductor memory. The software also transforms the physical state of such components in order to store data thereupon.

As another example, the computer-readable media disclosed herein can be implemented using magnetic or optical technology. In such implementations, the software presented herein transforms the physical state of magnetic or optical media, when the software is encoded therein. These transformations include altering the magnetic characteristics of particular locations within given magnetic media. These transformations also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices do not include all of the illustrated components shown in FIG. 9, include other components that are not explicitly shown in FIG. 9, or utilize an architecture completely different than that shown in FIG. 9.

The disclosure presented herein encompasses the subject matter set forth in the following example clauses.

Clause 1: A method of managing communications sessions in a communications network configured to support teletypewriter (TTY) and audio communications sessions, the method comprising:

receiving, by a device in the communications network from a first endpoint, a Session Initiation Protocol (SIP) message containing a Session Description Protocol (SDP) offer for a communications session, the SDP offer including a first parameter indicating whether the communications session will include media encoding TTY data, audio data, or both TTY data and audio data;

reading, by the device, the first parameter indicating whether the communications session will include media encoding TTY data, audio data, or both TTY data and audio data; and sending, by the device, an SDP answer including a second parameter indicating whether the device is configured to process media encoding TTY data, audio data, or both TTY data and audio data.

Clause 2: The method of clause 1, further comprising allowing the communications session based on the SDP answer.

Clause 3: The method of any of clauses 1-2, further comprising denying the communications session based on the SDP answer.

Clause 4: The method of any of clauses 1-3, wherein the device is an intermediate device.

Clause 5: The method of any of clauses 1-4, wherein the intermediate device is a session border controller (SBC).

Clause 6: The method of any of clauses 1-5, wherein the first parameter is inserted in an applicable payload.

Clause 7: The method of clauses 1-6, wherein the first parameter is an fmtp specifier comprising tty and an encoding scheme.

Clause 8: The method of any of clauses 1-7, wherein the communications network is a 5G network.

Clause 9: The method of any of clauses 1-8, wherein the encoding scheme is one of baudot, edt, or bell 103.

Clause 10: The method of any of clauses 1-9, wherein the intermediate device determines whether to accept or reject the communications session.

Clause 11: A system comprising:

a processor; and a memory storing computer-executable instructions thereupon which, when executed by the processor, cause the system to perform operations comprising:

receiving, from a first endpoint in a communications network, a Session Initiation Protocol (SIP) message containing a Session Description Protocol (SDP) offer for a communications session, the SDP offer including a first parameter indicating whether the communications session will include media encoding TTY data, audio data, or both TTY data and audio data;

reading the first parameter indicating whether the communications session will include media encoding TTY data, audio data, or both TTY data and audio data; and sending an SDP answer including a second parameter indicating whether the system is configured to process media encoding TTY data, audio data, or both TTY data and audio data.

Clause 12: The system of clause 11, further comprising computer-executable instructions thereupon which, when executed by the processor, cause the system to perform operations comprising initiating the communications session based on the SDP answer.

Clause 13: The system of any of clauses 11 and 12, further comprising computer-executable instructions thereupon which, when executed by the processor, cause the system to perform operations comprising denying the communications session based on the SDP answer.

Clause 14: The system of any clauses 11-13, wherein the system is a session border controller (SBC).

Clause 15: The system of any clauses 11-14, wherein the first parameter is inserted in an applicable payload.

Clause 16: The system of any clauses 11-15, wherein the first parameter is an fmtp specifier.

Clause 17: The system of any clauses 11-16, wherein the fmtp specifier is tty and an encoding scheme.

Clause 18: The system of any clauses 11-17, wherein the encoding scheme is one of baudot, edt, or bell 103.

Clause 19: A computer-readable storage medium having computer-executable instructions stored thereupon which, when executed by one or more processors of a computing device, cause the computing device to perform operations comprising:

receiving, from a first endpoint in a communications network, a Session Initiation Protocol (SIP) message containing a Session Description Protocol (SDP) offer for a communications session, the SDP offer including a first parameter indicating whether the communications session will include media encoding TTY data, audio data, or both TTY data and audio data;

reading the first parameter indicating whether the communications session will include media encoding TTY data, audio data, or both TTY data and audio data; and sending an SDP answer including a second parameter indicating whether the device is configured to process media encoding TTY data, audio data, or both TTY data and audio data.

Clause 20: The computer-readable storage medium of clause 19, wherein the first parameter is an fmtp specifier comprising tty and an encoding scheme, wherein the encoding scheme is one of baudot, edt, or bell 103.

The disclosure presented herein also encompasses the subject matter set forth in the following clauses:

Clause 21: A method of managing communications sessions in a communications network, the method comprising:

sending, by a caller device in the communications network to an endpoint of the communications network, a Session Initiation Protocol (SIP) message containing a Session Description Protocol (SDP) offer for a communications session between the caller device and the endpoint, the SDP offer including a first parameter indicating whether the communications session will include media encoding teletypewriter (TTY) data, audio data, or both TTY data and audio data;

receiving, by the device from the endpoint, an error response indicating that the endpoint has rejected the first parameter; and based on the error response, sending, to the endpoint, a modified SIP message containing the SDP offer for the communications session, the SDP offer excluding the first parameter indicating whether the communications session will include media encoding TTY data, audio data, or both TTY data and audio data.

Clause 22: The method of clause 21, further comprising allowing the communications session based on an SDP answer.

Clause 23: The method of any of clauses 21-22, further comprising denying the communications session based on an SDP answer.

Clause 24: The method of any of clauses 21-23, further comprising in response to the error response, determining that the endpoint supports the media contained in the communication session being offered.

Clause 25: The method of any of clauses 21-24, wherein the first parameter is an fmtp specifier.

Clause 26: The method of any of clauses 21-25, wherein the fmtp specifier is tty and an encoding scheme.

Clause 27: The method of clauses 21-26, wherein the encoding scheme is one of baudot, edt, or bell 103.

Clause 28: A method of managing communications sessions in a communications network, the method comprising:

receiving, by an intermediate device in the communications network from a caller device, a Session Initiation Protocol (SIP) message destined for a callee device, the SIP message containing a Session Description Protocol (SDP) offer for a communications session, the SDP offer including a first parameter indicating whether the communications session will include media encoding TTY data, audio data, or both TTY data and audio data;

detecting static content and media content in the communications session;

based on the static content and media content, modifying the SDP offer to align with the media content offered by the caller device, capabilities of the callee device, and policies of the communications network; and sending, by the intermediate device to the callee device, the modified SIP offer.

Clause 29: The system of clause 28, wherein the static content comprises a transcoding offer to an endpoint, a class, or individual device.

Clause 30: The system of any of clauses 28 and 29, further comprising allowing the communications session based on an SDP answer.

Clause 31: The system of any clauses 28-30, further comprising denying the communications session based on an SDP answer.

Clause 32: The system of any clauses 28-31, wherein the first parameter is an fmtp specifier.

Clause 33: The system of any clauses 28-32, wherein the fmtp specifier is tty and an encoding scheme.

Clause 34: The system of any clauses 28-33, wherein the encoding scheme is one of baudot, edt, or bell 103.

Clause 35: A computer-readable storage medium having computer-executable instructions stored thereupon which, when executed by one or more processors of a computing device, cause the computing device to perform operations comprising:

sending, to a first endpoint in a communications network, a Session Initiation Protocol (SIP) message containing a Session Protocol (SDP) offer for a communications session, the SDP offer including a first parameter indicating whether the communications session will include media encoding TTY data, audio data, or both TTY data and audio data;

receiving, from the first endpoint, an error response indicating that the first endpoint has rejected the first parameter; and based on the error response, sending, to the first endpoint, a modified SIP message containing the SDP offer for the communications session, the SDP offer excluding the first parameter indicating whether the communications session will include media encoding TTY data, audio data, or both TTY data and audio data.

Clause 36: The computer-readable storage medium of clause 35, further comprising computer-executable instructions stored thereupon which, when executed by one or more processors of a computing device, cause the computing device to perform operations comprising initiating the communications session based on an SDP answer.

Clause 37: The computer-readable storage medium of any of clauses 35 and 36, the memory storing computer-executable instructions thereupon which, when executed by the processor, cause the system to perform operations comprising denying the communications session based on an SDP answer.

Clause 38: The computer-readable storage medium of any of the clauses 35-37, the memory storing computer-executable instructions thereupon which, when executed by the processor, cause the system to perform operations comprising in response to an error response, determining that the endpoint supports media contained in the communication session being offered.

Clause 39: The computer-readable storage medium of any of the clauses 35-38, wherein the first parameter is an fmtp specifier.

Clause 40: The computer-readable storage medium of any of the clauses 35-39, wherein the fmtp specifier is tty and an encoding scheme.

What is claimed is:

1. A method of managing communications sessions in a communications network, the method comprising:

sending, by a caller device in the communications network to an endpoint of the communications network, a Session Initiation Protocol (SIP) message containing a Session description Protocol (SDP) offer for a communications session between the caller device and the endpoint, the SDP offer having an SDP formatted header including a first parameter in an attribute line of the header indicating whether the communications session will include media encoding teletypewriter (TTY) data, a second parameter in the attribute line of the header indicating whether the communications session will include media encoding audio data, or the first parameter and the second parameter indicating whether the communications session will include media encoding both TTY data and audio data;

receiving, by the device from the endpoint, an error response indicating that the endpoint has rejected the first or second parameter;

determining that the endpoint supports the media contained in the communication session being offered; and based on the determining, sending, to the endpoint, a modified SIP message containing the SDP offer for the communications session, the SDP offer having the SDP formatted header excluding the first parameter or second parameter indicating whether the communications session will include media encoding TTY data, audio data, or both TTY data and audio data, thereby establishing the communications session between the caller device and the endpoint as previously offered in the SIP message.

2. The method of claim 1, further comprising allowing the communications session based on an SDP answer.

3. The method of claim 1, further comprising denying the communications session based on an SDP answer.

4. The method of claim 1, wherein the first or second parameter is an fmtp specifier.

5. The method of claim 4, wherein the fmtp specifier is tty and an encoding scheme.

6. The method of claim 5, wherein the encoding scheme is one of baudot, edt, or bell103.

7. A method of managing communications sessions in a communications network, the method comprising:

receiving, by an intermediate device in the communications network from a caller device, a Session Initiation Protocol (SIP) message destined for a callee device, the SIP message containing a Session description Protocol (SDP) offer for a communications session, the SDP offer having an SDP formatted header including a first parameter in an attribute line of the header indicating whether the communications session will include media encoding TTY data, a second parameter in the attribute line of the header indicating whether the communications session will include media encoding audio data, or the first parameter and the second parameter indicating whether the communications session will include media encoding both TTY data and audio data;

detecting static content and media content in the communications session;

based on the static content and media content, modifying the SDP offer to align with the media content offered by the caller device, capabilities of the callee device, and policies of the communications network by modifying the SDP offer with an SDP formatted header excluding the first parameter or second parameter indicating whether the communications session will include media encoding TTY data, audio data, or both TTY data and audio data; and sending, by the intermediate device to the callee device, the modified SIP offer, thereby avoiding rejection of the offered communication session due to non-recognition of the first parameter or second parameter.

8. The method of claim 7, wherein the static content comprises a transcoding offer to an endpoint, a class, or individual device.

9. The method of claim 7, further comprising allowing the communications session based on an SDP answer.

10. The method of claim 7, further comprising denying the communications session based on an SDP answer.

11. The method of claim 7, wherein the first or second parameter is an fmtp specifier.

12. The method of claim 11, wherein the fmtp specifier is tty and an encoding scheme.

13. The method of claim 12, wherein the encoding scheme is one of baudot, edt, or bell103.

14. A computer-readable storage medium having computer-executable instructions stored thereupon which, when executed by one or more processors of a computing device, cause the computing device to perform operations comprising:

sending, to an endpoint in a communications network, a Session Initiation Protocol (SIP) message containing a Session description Protocol (SDP) offer for a communications session, the SDP offer having an SDP formatted header including a first parameter in an attribute line of the header indicating whether the communications session will include media encoding TTY data, a second parameter in the attribute line of the header indicating whether the communications session will include media encoding audio data, or the first parameter and the second parameter indicating whether the communications session will include media encoding both TTY data and audio data;

receiving, from the endpoint, an error response indicating that the endpoint has rejected the first or second parameter;

determining that the endpoint supports the media contained in the communication session being offered; and based on the determining, sending, to the endpoint, a modified SIP message containing the SDP offer for the communications session, the SDP offer having the SDP formatted header excluding the first parameter or second parameter indicating whether the communications session will include media encoding TTY data, audio data, or both TTY data and audio data, thereby allowing the communications session to be established with the endpoint as previously offered in the SIP message.

15. The computer-readable storage medium of claim 14, further comprising computer-executable instructions stored thereupon which, when executed by one or more processors of a computing device, cause the computing device to perform operations comprising initiating the communications session based on an SDP answer.

16. The computer-readable storage medium of claim 14, further comprising computer-executable instructions stored thereupon which, when executed by one or more processors of a computing device, cause the computing device to perform operations comprising denying the communications session based on an SDP answer.

17. The computer-readable storage medium of claim 15, wherein the first or second parameter is an fmtp specifier.

18. The computer-readable storage medium of claim 17, wherein the fmtp specifier is tty and an encoding scheme.

* * * * *